US008416072B2

(12) United States Patent
Tenarvitz (10) Patent No.: US 8,416,072 B2
(45) Date of Patent: Apr. 9, 2013

(54) REAL-TIME METHOD AND SYSTEM FOR LOCATING A MOBILE OBJECT OR PERSON IN A TRACKING ENVIRONMENT WHILE CONSERVING ELECTRICAL ENERGY IN A BATTERY-OPERATED TRACKING TAG ASSOCIATED WITH THE OBJECT OR PERSON

(75) Inventor: Henry J. Tenarvitz, Suttons Bay, MI (US)

(73) Assignee: Versus Technology, Inc., Traverse, MI (US)

( * ) Notice: Subject to any disclaimer, the term of this patent is extended or adjusted under 35 U.S.C. 154(b) by 773 days.

(21) Appl. No.: 12/623,667

(22) Filed: Nov. 23, 2009

(65) Prior Publication Data

US 2011/0121962 A1    May 26, 2011

(51) Int. Cl.
*G08B 1/08* (2006.01)
(52) U.S. Cl. ........... 340/539.13; 340/539.1; 340/539.11; 340/12.5; 340/12.51; 340/12.52; 340/13.24; 340/13.25; 340/13.26; 340/13.27
(58) Field of Classification Search ............... 340/539.1, 340/539.11, 539.13, 12.5, 12.51, 12.52, 13.24, 340/13.25, 13.26, 13.27
See application file for complete search history.

(56) References Cited

U.S. PATENT DOCUMENTS

| | | | |
|---|---|---|---|
| 4,868,859 | A | 9/1989 | Sheffer |
| 4,906,853 | A | 3/1990 | Linwood et al. |
| 5,017,794 | A | 5/1991 | Linwood et al. |
| 5,027,314 | A | 6/1991 | Linwood et al. |
| 5,027,383 | A | 6/1991 | Sheffer |
| 5,119,104 | A | 6/1992 | Heller |
| 5,131,019 | A | 7/1992 | Sheffer et al. |
| 5,276,496 | A | 1/1994 | Heller et al. |
| 5,355,222 | A | 10/1994 | Heller et al. |

(Continued)

OTHER PUBLICATIONS

International Preliminary Report on Patentability, Written Opinion of the International Searching Authority; International Application No. PCT/US2010/035502; dated May 30, 2012.

(Continued)

*Primary Examiner* — Daryl Pope
(74) *Attorney, Agent, or Firm* — Brooks Kushman P.C.

(57) ABSTRACT

A real-time method and system for locating a mobile object or person in a tracking environment while conserving electrical energy in a battery-operated tracking tag associated with the object or person are provided. The method includes modulating a first carrier signal with a first packet including a first set of identification data having a first length to obtain a first modulated signal. The first set of data identifies the tag associated with the object or person. The method also includes transmitting the first modulated signal containing the first packet. Transmission of the first modulated signal consumes a first amount of electrical energy. The first modulated signal has a first precision and a first range within the environment. The method further includes modulating a second carrier signal with a second packet including a second set of identification data reduced in length from and based on the first set of identification data. The method still further includes transmitting the second modulated signal containing the second packet. Transmission of the second modulated signal consumes an amount of electrical energy reduced from an amount of electrical energy consumed if the second set of identification data was not reduced in length. The method further includes receiving and demodulating the first and second modulated signals to obtain the first and second packets. Finally, the method includes processing the first and second packets of the received demodulated signals to obtain location of the tag within the tracking environment wherein total transmission energy is reduced.

18 Claims, 6 Drawing Sheets

U.S. PATENT DOCUMENTS

| | | | |
|---|---|---|---|
| 5,387,993 A | 2/1995 | Heller et al. | |
| 5,548,637 A | 8/1996 | Heller et al. | |
| 5,572,195 A | 11/1996 | Heller et al. | |
| 5,844,227 A * | 12/1998 | Schmidt et al. | 235/472.01 |
| 6,104,295 A | 8/2000 | Gaisser et al. | |
| 6,154,139 A | 11/2000 | Heller | |
| 6,462,656 B2 | 10/2002 | Ulrich et al. | |
| 6,838,992 B2 | 1/2005 | Tenarvitz | |
| 7,054,296 B1 * | 5/2006 | Sorrells et al. | 370/338 |
| 8,098,763 B2 * | 1/2012 | Imamura | 375/299 |
| 2002/0033418 A1 * | 3/2002 | Knowles et al. | 235/472.01 |
| 2005/0007251 A1 | 1/2005 | Crabtree et al. | |
| 2008/0218351 A1 | 9/2008 | Corrado et al. | |
| 2008/0224855 A1 | 9/2008 | Pearce et al. | |
| 2009/0135940 A1 * | 5/2009 | Imamura | 375/267 |
| 2010/0157935 A1 * | 6/2010 | Imamura | 370/330 |

OTHER PUBLICATIONS

International Search Report and Written Opinion; International Application No. PCT/US/10/35502; date of mailing Jul. 13, 2010.

* cited by examiner

REAL-TIME METHOD AND SYSTEM FOR LOCATING A MOBILE OBJECT OR PERSON IN A TRACKING ENVIRONMENT WHILE CONSERVING ELECTRICAL ENERGY IN A BATTERY-OPERATED TRACKING TAG ASSOCIATED WITH THE OBJECT OR PERSON

BACKGROUND OF THE INVENTION

1. Field of the Invention

This invention relates to real-time methods and systems for locating a mobile object or person in a tracking environment while conserving electrical energy in a battery-operated tracking tag associated with the object or person. At least one embodiment of the invention relates to methods and systems for prolonging the life expectancy of batteries utilized in active ID tags which, in turn, communicate tracking data as a conduit to a clinical-grade, real-time locating system (RTLS). Such methods and systems are provided to enable the tag to transmit a radio frequency (RF) data packet which is longer in length than a second, smaller transmitted infrared (IR) data packet whereby the total transmission energy is reduced.

2. Background Art

Battery-operated (i.e. active) tracking badges and tags often emit radio-frequency (RF) and other signals such as ultrasonic or infrared (IR) signals. These signals are used to precisely establish the real-time location of mobile assets and people to which the badges and tags are affixed.

Typical fire rates for IR are set at every 3 seconds on badges and 9 seconds for asset tags. RF signals are typically set at every 12 seconds on each type of badge. Firing rates can be preselected. Since some tags feature a motion sensor, the tag will go to "sleep" (fire less often to save on battery life) when there is no movement.

Recent asset tag batteries may last up to three years, depending on their preselected firing rate. Patient/personnel tags have a shorter battery life because they are in use and firing signals more frequently than asset tags, consequently, badge batteries typically last up to 18 months. In any event, however, battery-operated tracking tags have a fixed energy budget.

U.S. patent publication 2008/0218351 discloses an RFID tag conservation method and system for active multi-modal RFID tags, illuminator/tag/reader systems, circuit architecture and operational algorithms for battery power conservation that extends tag battery life from a typical 6 months to >5 years. The system is particularly useful in asset and person tracking/inventory systems where power conservation is critical. The tag is configured with a microprocessor operational instruction set algorithm, modifiable on the fly via RF or IR, to synchronize a periodic tag awaken/sense envelope that overlaps the illuminator trigger pulse cycle and puts the tag into deep, power conservation sleep for N periods of illuminator cycles. When the tag sees an illuminator signal with a different ID, or no illuminator signal at all, it transmits that anomaly via RF to a reader. This means the object or person with which the tag is associated has been moved out of the original illuminator field of view, permitting near real-time investigation and tracking.

The following U.S. patents are related to at least one embodiment of the invention: U.S. Pat. Nos. 6,154,139; 6,104,295; 5,027,314; 5,572,195; 5,548,637; 5,119,104; 5,017,794; 4,906,853; 5,387,993; 5,355,222; 5,276,496; 5,131,019; 5,027,383; 4,868,859; 6,838,992; and 6,462,656.

There are a number of drawbacks to the tag transmissions of the above-noted prior art relative to the amount of energy required to transmit over infrared carriers, particularly in relation to the much lower amount of energy required to transmit over radio frequency carriers. As such, the infrared ID, and thus the number of unique available IDs, is kept small to reduce the amount of energy required by the tag. Thus, it is clear that there is a need in the real-time locating environment for an improved method and system for conserving battery electrical energy in battery-operated tags associated with people or items tracked in a clinical or non-clinical environment while avoiding the shortcomings and drawbacks of current systems and methodologies.

SUMMARY OF THE INVENTION

An object of the present invention is to provide an improved real-time method and system for locating a mobile object or person in a tracking environment while conserving electrical energy in a battery-operated tracking tag associated with the object or person.

Another object of at least one embodiment of the present invention is to provide an improved system and method for increasing the number of unique tag IDs available for the purposes of tracking patients, staff and assets in a healthcare setting utilizing a real-time tracking system, and, in doing so, also provide an improved system and method for optimizing the longevity of a battery-operated tracking tag by reducing the amount of electrical energy required to transmit tag ID and location relative to a real-time tracking environment typically deployed in a healthcare facility.

In carrying out the above object and other objects of the present invention, a real-time method of locating a mobile object or person in a tracking environment while conserving electrical energy in a battery-operated tracking tag associated with the object or person is provided. The method includes modulating a first carrier signal with a first packet including a first set of identification data having a first length to obtain a first modulated signal. The first set of data identifies the tag associated with the object or person. The method further includes transmitting the first modulated signal containing the first packet. Transmission of the first modulated signal consumes a first amount of electrical energy. The first modulated signal has a first precision and a first range within the environment. The method still further includes modulating a second carrier signal with a second packet including a second set of identification data reduced in length from and based on the first set of identification data. The method further includes transmitting the second modulated signal containing the second packet. Transmission of the second modulated signal consumes an amount of electrical energy reduced from an amount of electrical energy consumed if the second set of identification data was not reduced in length. The method still further includes receiving and demodulating the first and second modulated signals to obtain the first and second packets. The method finally includes processing the first and second packets of the received demodulated signals to obtain location of the tag within the tracking environment where total transmission energy is reduced.

The method may include receiving a request signal which represents a request for a set of identification data greater in length than the second set of identification data.

The tracking environment may be a clinical environment.

The second modulated signal may have a second precision greater than the first precision and a second range within the environment shorter than the first range.

The tracking tag may be a multi-model tracking tag.

The first set of data may uniquely identify the tag and the second set of data does not uniquely identify the tag.

The step of processing may include the step of applying a matching algorithm to the first and second packets of the received demodulated signals to match signals transmitted from the same tag.

The method may include applying a length reduction algorithm to the first set of identification data to obtain the second set of identification data.

The step of applying may include the step of applying a length reduction algorithm to the first set of identification data of the demodulated first signal to obtain a result and comparing the result to the second set of identification data of the demodulated second signal.

Further in carrying out the above object and other objects of the present invention, a real-time system for locating a mobile object or person in a tracking environment while conserving electrical energy in a battery-operated tracking tag associated with the object or person is provided. The system includes apparatus for modulating a first carrier signal with a first packet including a first set of identification data having a first length to obtain a first modulated signal. The first set of data identifies the tag associated with the object or person. The system further includes apparatus for transmitting the first modulated signal containing the first packet. Transmission of the first modulated signal consumes a first amount of electrical energy. The first modulated signal has a first precision and a first range within the environment. The system still further includes apparatus for modulating a second carrier signal with a second packet including a second set of identification data reduced in length from and based on the first set of identification data. The system further includes apparatus for transmitting the second modulated signal containing the second packet. Transmission of the second modulated signal consumes an amount of electrical energy reduced from an amount of electrical energy consumed if the second set of identification data was not reduced in length. The system still further includes apparatus for receiving and demodulating the first and second modulated signals to obtain the first and second packets. The system further includes a processor for processing the first and second packets of the received demodulated signals to obtain location of the tag within the tracking environment wherein total transmission energy is reduced.

The system may further include means for receiving a request signal which represents a request for a set of identification data greater in length than the second set of identification data.

The tracking environment may be a clinical environment.

The second modulated signal may have a second precision greater than the first precision and a second range within the environment shorter than the first range.

The tracking tag may be a multi-model tracking tag.

The first set of data may uniquely identify the tag and the second set of data does not uniquely identify the tag.

The processor may apply a matching algorithm to the first and second packets of the received demodulated signals to match signals transmitted from the same tag.

The processor may apply a length reduction algorithm to the first set of identification data to obtain the second set of identification data.

The processor may apply a length reduction algorithm to the first set of identification data of the demodulated first signal to obtain a result and compare the result to the second set of identification data of the demodulated second signal.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Referring now to the drawing figures, there is illustrated a system, generally indicated at 10, for locating subjects (i.e. persons and objects) in a tracking environment. In general, the system 10 is a combined infrared and radio frequency locating system which is adapted for use not only in medical applications, but also in non-medical applications. The system 10 is a fully automatic data collection system which provides real-time location information of personnel or equipment (i.e. subjects). Typically, information is collected using an in-ceiling and/or in-wall sensor network connected together via a serial network 22. Each serial network 22 terminates at the microprocessor-based collector 30.

The system 10 includes a plurality of small multi-modal tracking tags, each of which is generally indicated at 12. A tag 12 having a unique ID is provided for each subject to be tracked within the tracking environment. The size of the unique ID component of the data packet transmitted by the tag 12 determines the total number of unique tag IDs available in the tracking environment and is dictated by the total number of unique subjects present in the tracking environment 10.

Each tag 12 transmits a radio frequency (i.e. RF) signal 53 via an antenna 16, containing a data packet with at least the unique tag ID, in a substantially spherical pattern. The radio frequency signal 53 emitted by the antennas 16 are received by an antenna 24 of a radio frequency receiver 26 having a range of approximately 100 feet 28 in all directions. The radio frequency receiver 26 converts encoded signals 53 emitted by the tag 12 into electrical signals and transmits them via the serial network 22.

Each tag 12 also emits infrared light via an IR transmitter or LED 48, containing digitally encoded data generated by using the microprocessor 46 to apply a size reduction function or algorithm 67 to the RF data packet 55. This is done to avoid the high power consumption required to simply retransmit the identical RF data packet 53 via the IR LED 48. The system 10 also includes a receiver assembly including a plurality of infrared receivers 20 which are utilized to receive the badges' infrared signals 14 and transmit coded data via the serial network 22. Each infrared receiver 20 on the serial network 22 has internally assigned a two digit identifier 9 typically starting with the number one then incremented by one for each successive infrared receiver 20 on the serial network. Thus, the two digit identifier 9 represents the unique location monitored by each infrared receiver 20 on this serial network 22. Typically, the effective line-of-sight range of such infrared signals 14 is about a 20 meter diameter 23. To achieve higher granularity within the system 10, the infrared receiver 20 may have its field of view reduced to as little as a 1 meter diameter 27 by introducing a restrictor 25 in the IR sensor 20. The infrared receiver 20 reads the encoded signals 14 emitted by the IR transmitter 48, appends the encoded two digit identifier 9, then converts the entire combination to electrical signals which are transmitted via the serial network 22.

The RF signal 53 is sent via an antenna 16 and contains a data packet 55 with at least the 4 byte ID data space providing 4,294,967,296 unique tag IDs 54. Additionally the RF data packet 55 may generate error checking data 64 and tag qualifier data 65 (e.g. battery state, motion state, alarm state) as an optional prefix 56 and/or optional suffix 57 to the unique Tag ID 54.

The IR signal 14 emitted via the LED 48 contains a data packet 66 that is a result of the microprocessor 46 having applied a size reduction function or algorithm 67 to the RF data packet 55. The resulting packet 66 is shorter than the parent RF data packet 55 thereby reducing the amount of energy required to send the IR signal 14 when compared to retransmitting the entire RF data packet 55 via an IR signal.

The size reduction function 67 may be a checksum, CRC or other function that derives a smaller number from a larger number in such a way as to increase the statistical probability of there being only one unique size reduction function 67 result for each unique tag ID 54 within the area covered 28 by a radio frequency receiver 26.

The signals appearing along the connection 22 are received by a microprocessor-based collector 30, identifiable by a unique 10 digit identifier 76, which maintains an RF buffer 70 of recent RF data packets 55 and an IR buffer 72 of recent IR data packets 66. Each time a new RF data packet 55 or a new IR data packet 66 is received the microprocessor-based collector 30 executes the match process 72 then a buffer review process 73 in an attempt to match transmissions that originated from the same badge 14. If the necessary criteria are met the microprocessor-based collector 30 appends its unique 10 digit identifier 76 to the RF data packet 55 (that may have the infrared receiver's 20 two digit identifier 9 appended to it) and delivers this combined data to a concentrator of the locating system. The locating system also includes a computer and database for storing data as is well known in the art.

Figure 1:
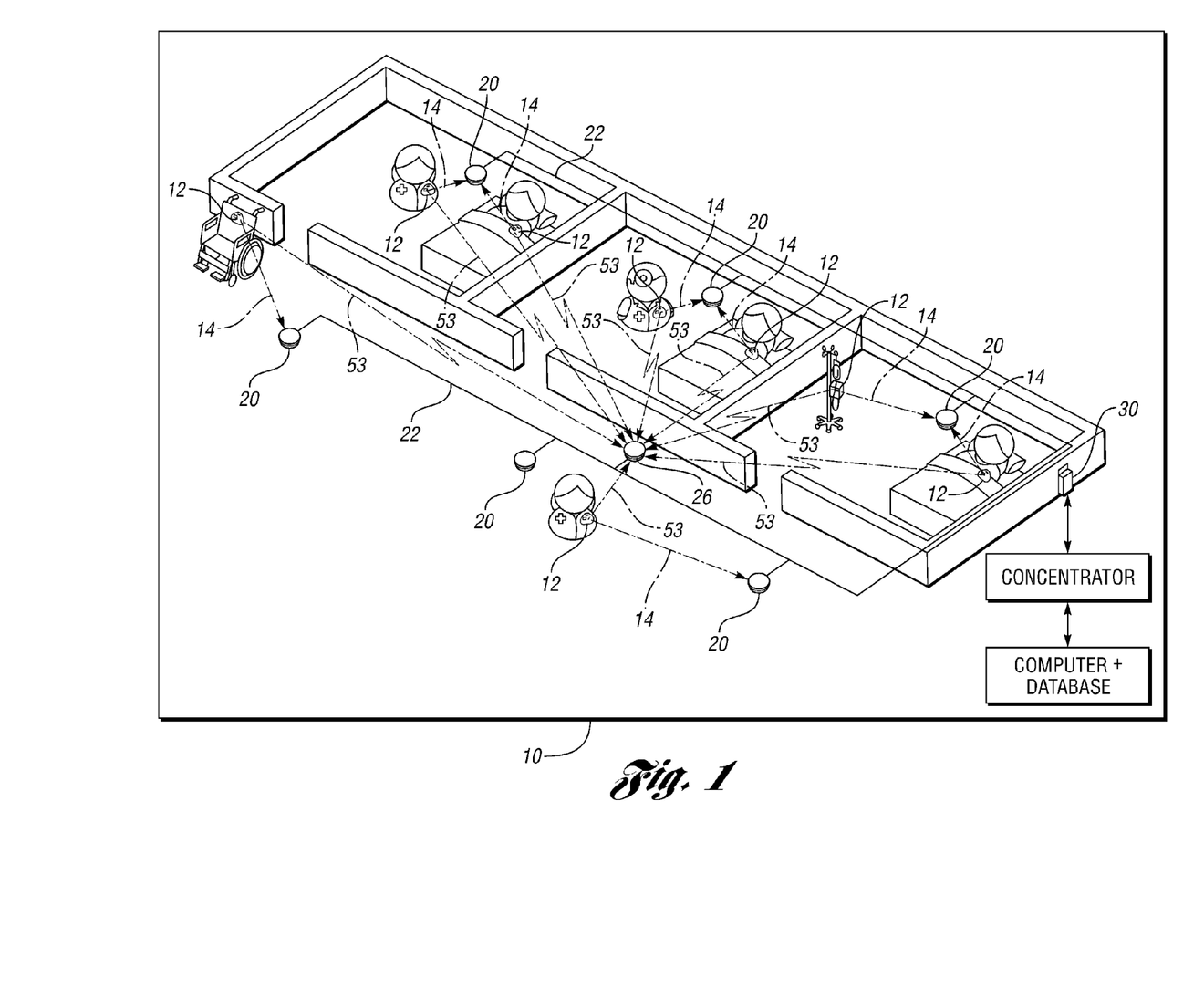
FIG. 1 is a schematic overview diagram illustrating a method and system of a first embodiment of the invention.
Figure 2:
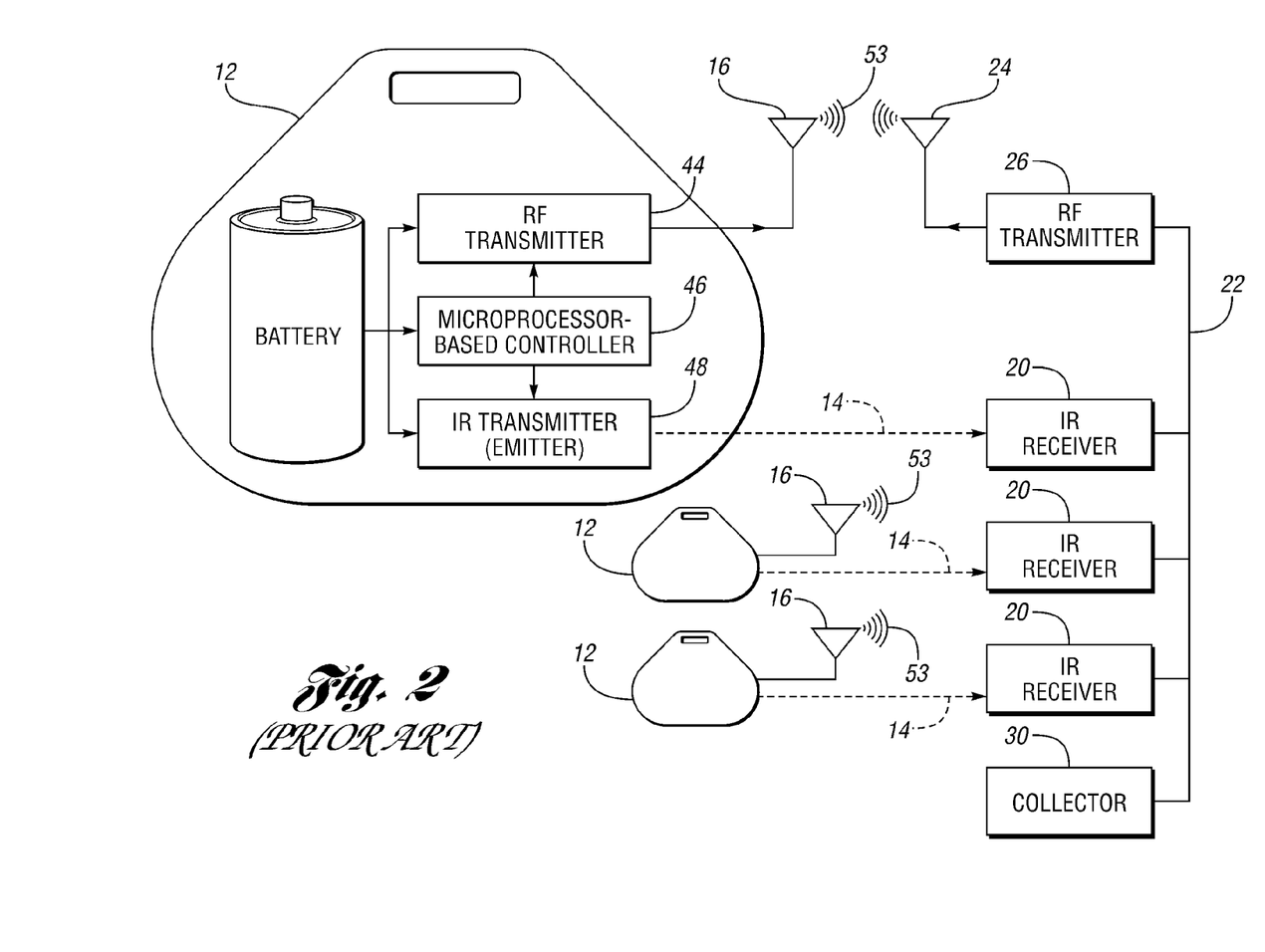
FIG. 2 is a schematic block diagram also illustrating the method and system of FIG. 1.
Figures 3, 3A, 3B:
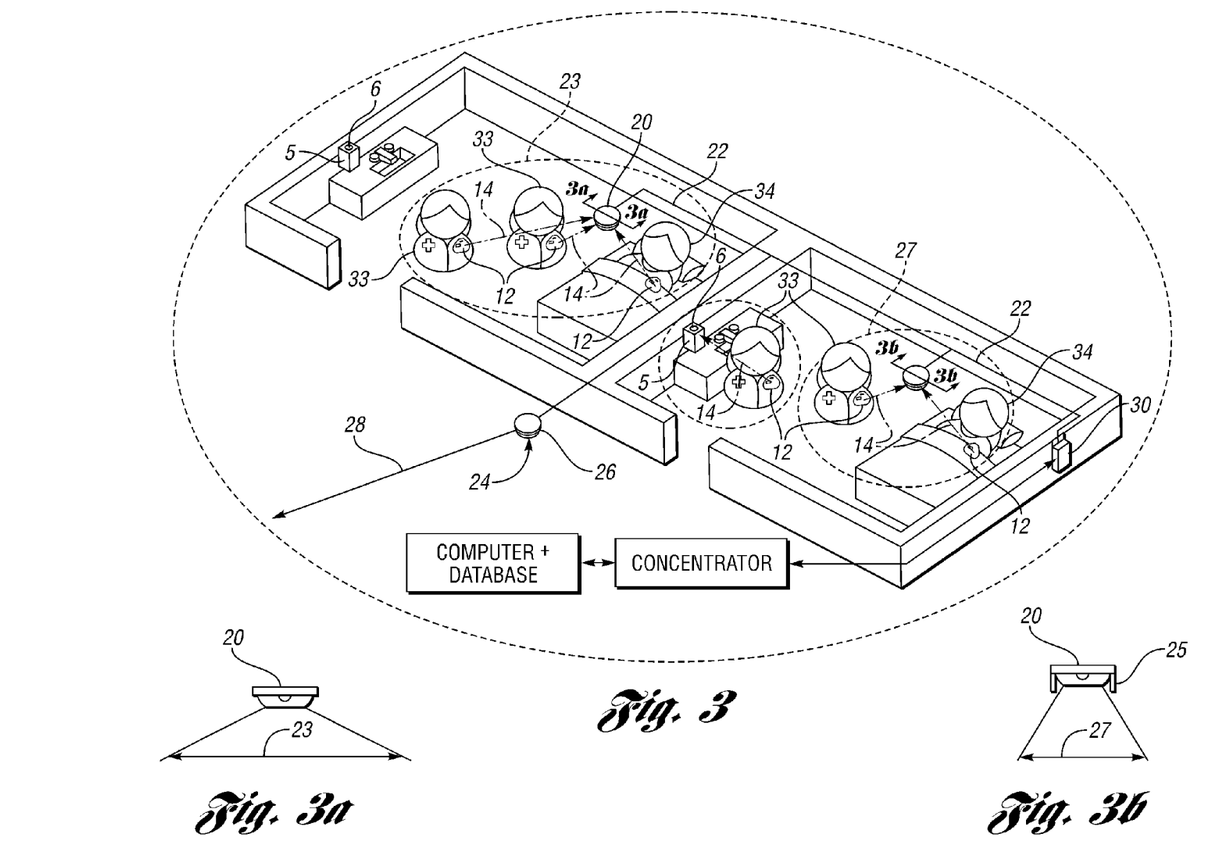
FIG. 3 is a diagram similar to the diagram of FIG. 1 but illustrating a method and system of a second embodiment of the invention.
Figure 4:
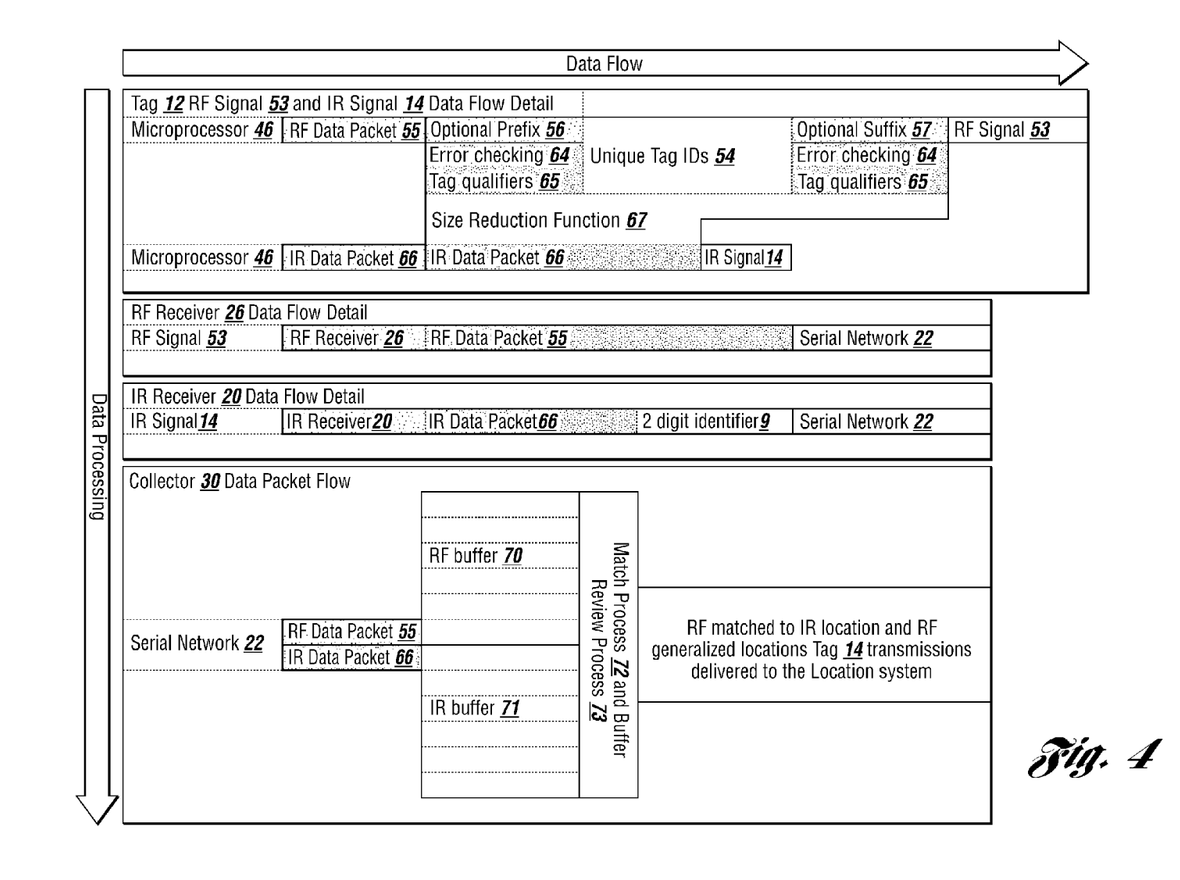
FIG. 4 is a diagram of data flow versus data processing in accordance with at least one embodiment of the invention.
Figure 5:
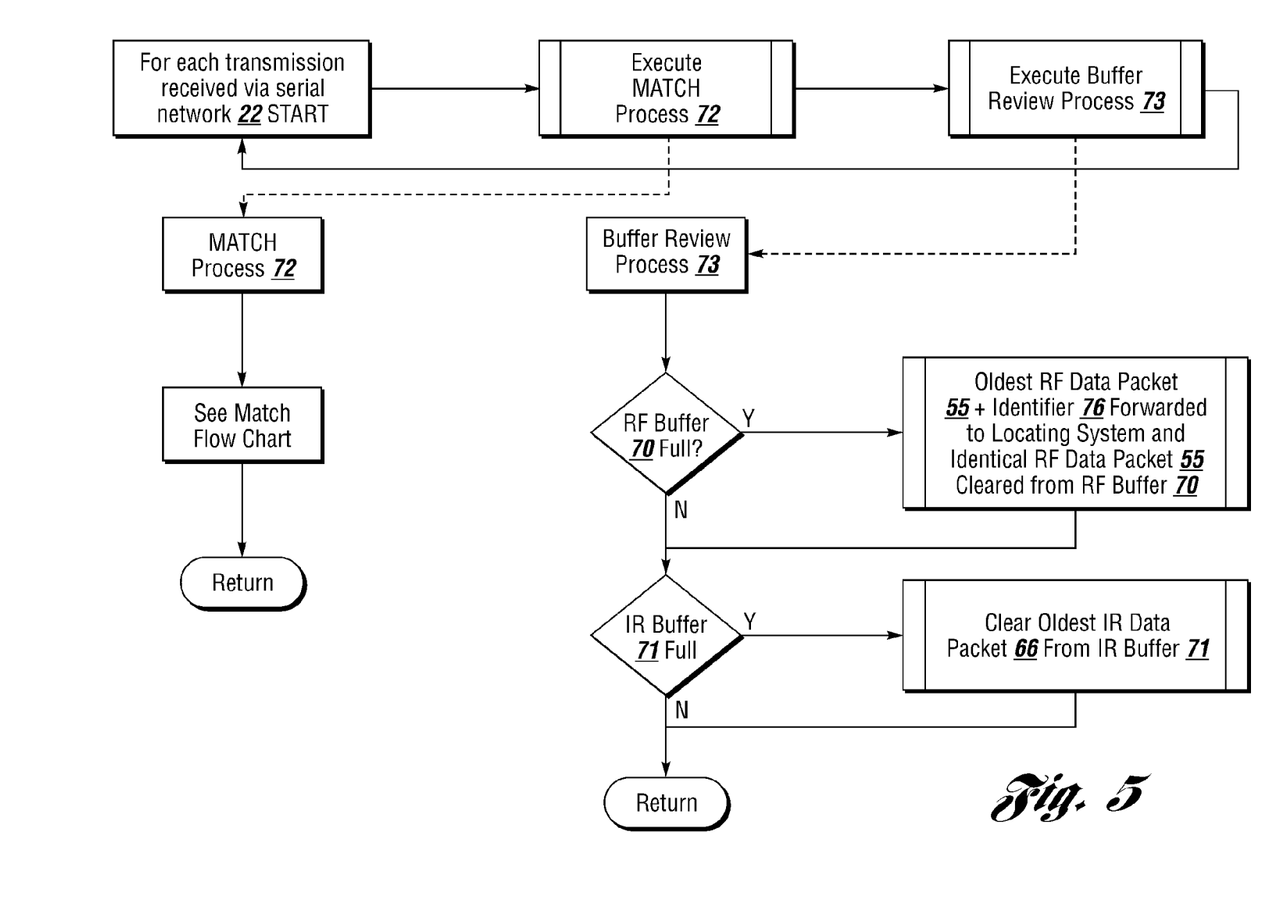
FIG. 5 is a block diagram flow chart illustrating processing steps performed by a microprocessor-based collector of the system.
Figure 6:
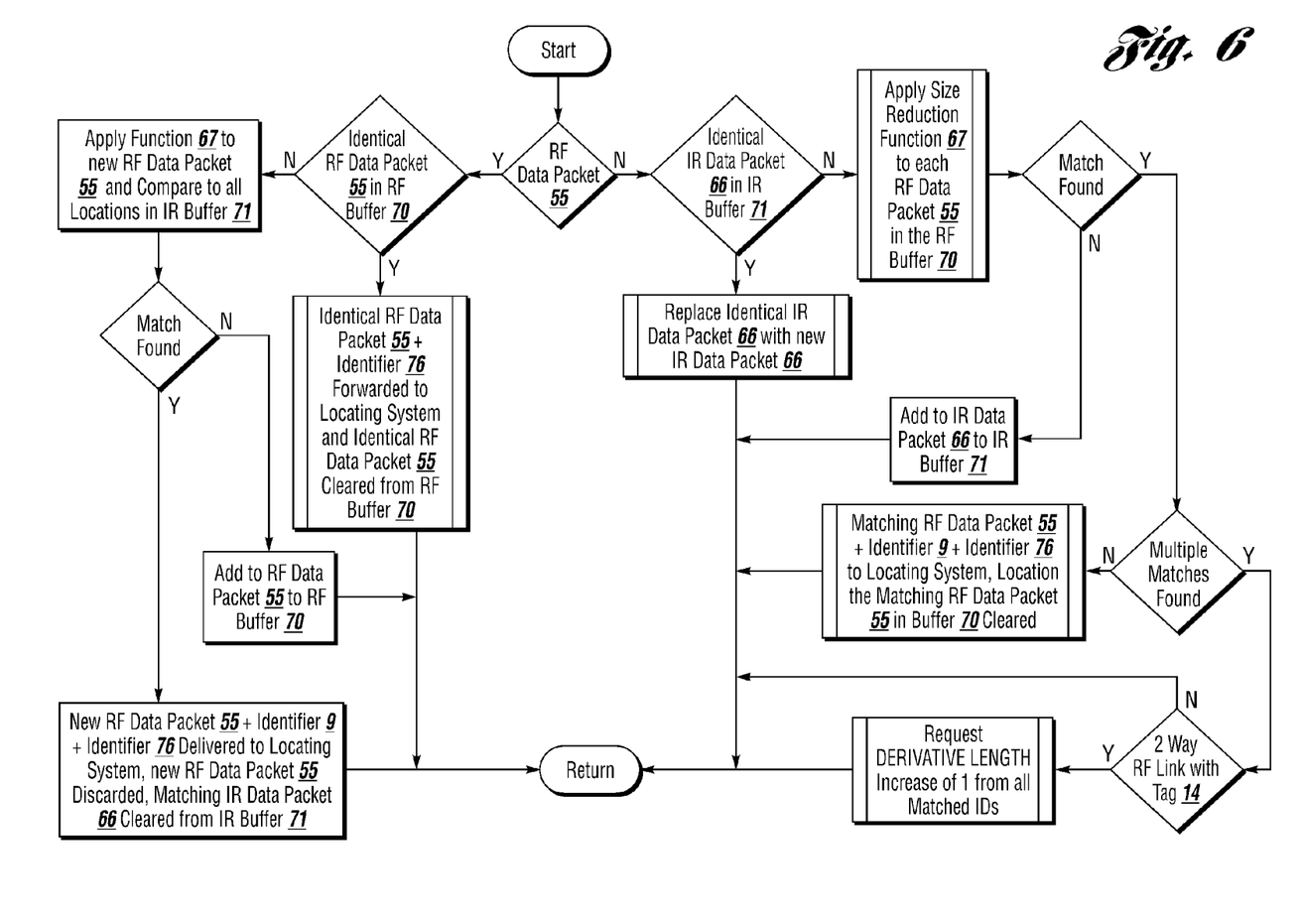
FIG. 6 is a block diagram flow chart illustrating a match process step performed within one of the blocks of FIG. 5.

The match process 72 examines each incoming data packet. If the newly received packet is an RF data packet 55 then the match process or routine 72 examines the RF buffer 70 for an identical RF data packet 55. If an identical RF data packet 55 is found then the unique 10 digit identifier 76 is appended to the duplicate RF data packet 55, the combined data is forwarded on to the locating system and then the most recent RF data packet 55 replaces the duplicate in the RF buffer 70. The match process 72 takes no further action and passes control to the review process 73.

If an identical RF data packet 55 is not found, then the match process 72 now applies the size reduction function 67 to each of the newly received RF data packets 55 and compares the result to each IR data packet 66 in the IR buffer 71. If a match is found then the two digit identifier 9 of the IR sensor 20 from the matching IR data packet 66 and the unique 10 digit identifier 76 associated with microprocessor-based collector 30 are appended to the newly received RF data packet 55 and the combined data is forwarded to the location system. The newly received RF data packet 55 and the matching IR data packet 66 are discarded and the location in the IR buffer 71 of matching IR data packet 66 is cleared.

If neither an identical RF data packet 55 nor a matching IR data packet 66 is found, then the newly received RF data packet 55 is added to the RF buffer 70 and the match process 72 and takes no further action and passes control to the review process 73.

If the new packet is an IR data packet 66 then the match process 72 examines the IR buffer 71 for an identical IR data packet 66. If an identical IR data packet 66 is found the newly received IR data packet 66 is discarded, the match process 72 takes no further action and passes control to the review process 73.

If an identical IR data packet 66 is not found, then the match process 72 now applies the size reduction function 67 to each RF data packet 55 in the RF buffer 70 and compares the result to the newly received IR data packet 66. If no match is found, then the IR data packet 66 is stored in the next available location in the IR buffer 71. The match process 72 then passes control to the review process 73.

If a single match is found then the two digit identifier 9 of the IR sensor 20 that delivered this IR data packet 66 and the unique 10 digit identifier 76 associated with microprocessor-based collector 30 are appended to the matching RF data packet 55 and the combined data is forwarded to the location system. The newly received IR data packet 66 is discarded and the location in the RF buffer 70 of the RF data packet 55 is cleared.

If multiple matches are found, then the match process 72 will request that all badges 14 with the tag IDs 54 contained in all RF data packets 55 that matched the newly received IR data packet 66 retransmit a new IR data packet 66 with an incrementally lengthened result of the size reduction function 67 for subsequent processing by the match process 72. The match process 72 then passes control to the review process 73. Alternatively, in the event there is no communication link or channel available from the microprocessor-based collector 30 back to the badge 14, the newly received IR data packet 66 is simply discarded.

The buffer review process 73 then inspects the RF buffer 70 and if it is full then the oldest RF data packet 55 is delivered to the concentrator of the locating system and its location in the RF buffer 70 is cleared.

The buffer review process 73 inspects the IR buffer 71 and if it is full then the oldest IR data packet 66 is discarded and its location in the IR buffer 71 is cleared. The buffer review process 73 then returns control to the microprocessor-based collector 30.

In summary, a method and system of at least one embodiment of the invention, maximizes the number of unique IDs that are available within the real-time tracking system. The method includes the steps of, for each subject, providing a small, multi-modal tracking tag that transmits the unique ID via infrared to provide room-level accuracy and radio frequency for superior transmission reliability. An array of infrared and radio frequency receivers is provided to create the tracking environment and determine location of the tag affixed to the subject.

A system and method of at least one embodiment of the invention transmits infrared and radio frequency signals from the tracking tag to the receivers. The method includes transmission of a modulated first carrier signal which contains the set of data identifying the person or object to which the tag is affixed as well as the location and range of the tag within the tracking environment coupled to a second transmission of a second modulated carrier signal which contains a second set of identification data, but which is shorter in transmission length than the first modulated signal.

The method of at least one embodiment of the invention includes: (1) modulating a first carrier signal with a first packet including a first set of subject identification data having a first set length to obtain a first modulated signal; (2) transmitting the first modulated signal containing the first packet, transmission of the first modulated signal consuming a first amount of electrical energy, the first modulated signal having a first location precision and a first range within the tracking environment; (3) modulating a second carrier signal with a second packet including a second set of identification data reduced in length from the first set of identification data; and (4) transmitting the second modulated signal containing the second packet, transmission of the second modulated signal consuming a reduced amount of electrical energy.

The transmission of infrared and radio frequency signals may also be reversed and sent from an in-room emitting device to be received by a tag having receiving capability and affixed to a mobile subject, such as a person or object.

The first and second modulated signals are received by the sensors and relayed to other apparatus of the real-time tracking system which demodulates the signals to obtain the first and second packets.

A method and system of at least one embodiment of the invention continuously scans the transmissions returned to the locating system to recognize identical derivatives. The method includes the steps of, for each data packet, matching IDs and potentially requesting a new, incremented derivative length from all IDs found to be matching, repeating the process until the IDs no longer match or the review process times out.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A real-time method of locating a mobile object or person in a tracking environment while conserving electrical energy in a battery-operated tracking tag associated with the object or person, the method comprising:
    modulating a first carrier signal with a first packet including a first set of identification data having a first length to obtain a first modulated signal, the first set of data identifying the tag associated with the object or person;
    transmitting the first modulated signal containing the first packet, transmission of the first modulated signal consuming a first amount of electrical energy, the first modulated signal having a first precision and a first range within the environment;
    modulating a second carrier signal with a second packet including a second set of identification data reduced in length from and based on the first set of identification data;
    transmitting the second modulated signal containing the second packet, transmission of the second modulated signal consuming an amount of electrical energy reduced from an amount of electrical energy consumed if the second set of identification data was not reduced in length;
    receiving and demodulating the first and second modulated signals to obtain the first and second packets; and
    processing the first and second packets of the received demodulated signals to obtain location of the tag within the tracking environment wherein total transmission energy is reduced.

2. The method as claimed in claim 1, further comprising receiving a request signal which represents a request for a set of identification data greater in length than the second set of identification data.

3. The method as claimed in claim 1, wherein the tracking environment is a clinical environment.

4. The method as claimed in claim 1, wherein the first set of data uniquely identifies the tag and the second set of data does not uniquely identify the tag.

5. The method as claimed in claim 1, wherein the step of processing includes the step of applying a matching algorithm to the first and second packets of the received demodulated signals to match signals transmitted from the same tag.

6. The method as claimed in claim 1, further comprising applying a length reduction algorithm to the first set of identification data to obtain the second set of identification data.

7. The method as claimed in claim 5, wherein the step of applying includes the step of applying a length reduction algorithm to the first set of identification data of the demodulated first signal to obtain a result and comparing the result to the second set of identification data of the demodulated second signal.

8. The method as claimed in claim 1, wherein the second modulated signal has a second precision greater than the first precision and a second range within the environment shorter than the first range.

9. The method as claimed in claim 1, wherein the tracking tag is a multi-model tracking tag.

10. A real-time system for locating a mobile object or person in a tracking environment while conserving electrical energy in a battery-operated tracking tag associated with the object or person, the system comprising:
    means for modulating a first carrier signal with a first packet including a first set of identification data having a first length to obtain a first modulated signal, the first set of data identifying the tag associated with the object or person;
    means for transmitting the first modulated signal containing the first packet, transmission of the first modulated signal consuming a first amount of electrical energy, the first modulated signal having a first precision and a first range within the environment;
    means for modulating a second carrier signal with a second packet including a second set of identification data reduced in length from and based on the first set of identification data;
    means for transmitting the second modulated signal containing the second packet, transmission of the second modulated signal consuming an amount of electrical energy reduced from an amount of electrical energy consumed if the second set of identification data was not reduced in length;
    means for receiving and demodulating the first and second modulated signals to obtain the first and second packets; and
    a processor for processing the first and second packets of the received demodulated signals to obtain location of the tag within the tracking environment wherein total transmission energy is reduced.

11. The system as claimed in claim 10, further comprising means for receiving a request signal which represents a request for a set of identification data greater in length than the second set of identification data.

12. The system as claimed in claim 10, wherein the tracking environment is a clinical environment.

13. The system as claimed in claim 10, wherein the second modulated signal has a second precision greater than the first precision and a second range within the environment shorter than the first range.

14. The system as claimed in claim 10, wherein the tracking tag is a multi-model tracking tag.

15. The system as claimed in claim 10, wherein the first set of data uniquely identifies the tag and the second set of data does not uniquely identify the tag.

16. The system as claimed in claim 10, wherein the processor applies a matching algorithm to the first and second packets of the received demodulated signals to match signals transmitted from the same tag.

17. The system as claimed in claim 10, wherein the processor applies a length reduction algorithm to the first set of identification data to obtain the second set of identification data.

18. The system as claimed in claim 16, wherein the processor applies a length reduction algorithm to the first set of identification data of the demodulated first signal to obtain a result and compares the result to the second set of identification data of the demodulated second signal.

* * * * *